(12) United States Patent
Behrens et al.

(10) Patent No.: US 11,661,198 B2
(45) Date of Patent: May 30, 2023

(54) COOLING SYSTEM, AIR CONDITIONING PACK, AND METHOD FOR CONDITIONING AIR

(71) Applicant: THE BOEING COMPANY, Chicago, IL (US)

(72) Inventors: William Webster Behrens, Berkeley, MO (US); Andrew Richard Tucker, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 634 days.

(21) Appl. No.: 15/927,159

(22) Filed: Mar. 21, 2018

(65) Prior Publication Data
US 2019/0291875 A1    Sep. 26, 2019

(51) Int. Cl.
*B64D 13/08* (2006.01)
*B64D 13/06* (2006.01)
(Continued)

(52) U.S. Cl.
CPC ............ *B64D 13/08* (2013.01); *B64D 13/06* (2013.01); *F02C 7/12* (2013.01); *F02C 7/32* (2013.01);
(Continued)

(58) Field of Classification Search
CPC .............. B64D 13/08; B64D 13/06; B64D 2013/0611; B64D 2013/0618; B64D 2013/0644; B64D 2013/0648; B64D 2013/064; F02C 7/32; F02C 7/12; F25B 31/026

See application file for complete search history.

(56) References Cited

U.S. PATENT DOCUMENTS 4,261,416 A * 4/1981 Hamamoto ............ B64D 13/06
165/271
5,887,445 A 3/1999 Murry et al.
(Continued)

FOREIGN PATENT DOCUMENTS

EP    1112930 A2    7/2001
EP    2918497 A1    9/2015

OTHER PUBLICATIONS

Extended European Search Report for corresponding EP Application No. 19157231.2 dated Jul. 24, 2019 (5 pages).

*Primary Examiner* — Tavia Sullens
(74) *Attorney, Agent, or Firm* — The Small Patent Law Group LLC; Philip S. Hof

(57) ABSTRACT

An air conditioning pack of a cooling system includes an air cycle machine assembly, a cabin air compressor assembly, and a mixing duct. The air cycle machine assembly includes a compressor configured to receive an air stream that includes bleed air to generate a compressed air stream. The air cycle machine assembly utilizes a first portion of the compressed air stream to power the compressor. The cabin air compressor assembly receives a second portion of the compressed air stream, and utilizes the second portion to generate compressed ram air. The mixing duct receives the compressed ram air and allows the compressed ram air to mix with one or more of the air stream upstream of the compressor or the compressed air stream downstream of the compressor to generate a hybrid air stream that is used for cooling at least a portion of a vehicle.

21 Claims, 7 Drawing Sheets

(51) Int. Cl.
*F02C 7/12* (2006.01)
*F02C 7/32* (2006.01)
*F25B 31/02* (2006.01)

(52) U.S. Cl.
CPC .... *F25B 31/026* (2013.01); *B64D 2013/0611* (2013.01); *B64D 2013/0618* (2013.01); *B64D 2013/0644* (2013.01); *B64D 2013/0648* (2013.01)

(56) References Cited

U.S. PATENT DOCUMENTS

| | | | |
|---|---|---|---|
| 5,899,085 | A | 5/1999 | Williams |
| 9,656,756 | B2 | 5/2017 | Atkey |
| 2007/0113579 | A1 | 5/2007 | Claeys et al. |
| 2009/0117840 | A1* | 5/2009 | Kresser .................. B64D 13/06 454/71 |
| 2011/0107777 | A1 | 5/2011 | Atkey et al. |
| 2012/0285184 | A1 | 11/2012 | Voinov |
| 2013/0318983 | A1 | 12/2013 | Zhou et al. |
| 2014/0305130 | A1* | 10/2014 | Shepard .................. B64D 13/06 60/773 |
| 2015/0166187 | A1* | 6/2015 | Durbin ................... B64D 13/08 62/79 |
| 2015/0251766 | A1* | 9/2015 | Atkey .................... B64D 13/08 244/13 |
| 2016/0229542 | A1 | 8/2016 | Bruno et al. |
| 2017/0341766 | A1* | 11/2017 | Bruno .................... B64D 13/08 |

* cited by examiner

COOLING SYSTEM, AIR CONDITIONING PACK, AND METHOD FOR CONDITIONING AIR

FIELD OF EMBODIMENTS OF THE DISCLOSURE

Embodiments of the present disclosure generally relate to cooling systems and methods for conditioning air for use in cooling vehicles, such as commercial aircraft.

BACKGROUND OF THE DISCLOSURE

Known air conditioning systems used in transport vehicles, such as commercial aircraft, typically use an air-based thermodynamic cycle to provide cool, pressurized air to various interior compartments of the aircraft, such as a passenger cabin, flight deck, cargo compartments, and the like. At least some known air conditioning systems are powered exclusively by bleed air extracted from the compressor stages of vehicle engines, such as gas turbine engines of an aircraft. The bleed air from the engine is at an elevated temperature and pressure as compared to the air within the vehicle. The air conditioning systems can use ram air from the ambient environment outside of the vehicle only to cool the bleed air. After absorbing heat from the bleed air, the ram air is discharged into the ambient environment. Once the bleed air is cooled and conditioned in the air conditioning system, the bleed air is then used for various vehicle cooling tasks. For example, the bleed air may be distributed into the passenger cabin for temperature control, ventilation, and pressurization within the passenger cabin.

The operation of typical air conditioning systems may reduce fuel economy and/or efficiency of the vehicle. For example, the use of bleed air from the engine or other bleed air source for air conditioning diverts power that could otherwise be used for propulsion. Using bleed air to cool and condition the passenger cabin may reduce fuel economy and/or efficiency during operation of the vehicle because work from fuel combustion is expended to generate the high pressure bleed air instead of provide propulsion. Furthermore, using ram air to cool the bleed air typically requires capturing ambient air during movement of the vehicle and directing the ambient air into the vehicle through air intakes or vents, which increases drag on the vehicle (relative to directing less ambient air into the vehicle). The increased drag may reduce fuel economy and efficiency because more energy may be needed to propel the vehicle through the ambient environment at a given velocity.

SUMMARY OF THE DISCLOSURE

Certain embodiments of the present disclosure provide a cooling system for a vehicle. The cooling system includes an air conditioning package and a control circuit. As used herein, the air conditioning package may include or represent a self-contained air conditioning unit or assembly. For example, the air conditioning package according to one or more embodiments described herein may be self-contained within a housing or case, and optionally may be portable to enable the air conditioning pack to be installed on the vehicle. The term "air conditioning package" is also referred to herein as "air conditioning pack".

The air conditioning pack of the cooling system according to one or more embodiments includes an air cycle machine assembly, a cabin air compressor assembly, and a mixing duct. The air cycle machine assembly includes a compressor configured to receive an air stream that includes bleed air to generate a compressed air stream. The air cycle machine assembly is configured to utilize a first portion of the compressed air stream from the compressor to power the compressor. The cabin air compressor assembly is configured to receive a second portion of the compressed air stream from the compressor, and to utilize the second portion to generate compressed ram air. The mixing duct is configured to receive the compressed ram air and allow the compressed ram air to mix with one or more of the air stream upstream of the compressor or the compressed air stream downstream of the compressor to generate a hybrid air stream that is used for cooling at least a portion of a vehicle.

Certain embodiments of the present disclosure provide a cooling system for a vehicle. The cooling system includes an air conditioning pack and a control circuit. The air conditioning pack includes an air cycle machine assembly, a cabin air compressor assembly, and one or more mixing ducts. The air cycle machine assembly includes a compressor configured to receive an air stream that includes bleed air to generate a compressed air stream. The air cycle machine assembly is configured to utilize a first portion of the compressed air stream from the compressor to power the compressor. The cabin air compressor assembly is configured to receive a second portion of the compressed air stream from the compressor of the air cycle machine assembly. The second portion is discrete from the first portion. The cabin air compressor assembly is configured to utilize the second portion to generate compressed ram air. The one or more mixing ducts are configured to receive the compressed ram air and allow the compressed ram air to mix with one or more of the air stream upstream of the compressor or the compressed air stream downstream of the compressor to generate a hybrid air stream that is used for cooling at least a portion of the vehicle. The control circuit is operatively connected to the air conditioning pack. The control circuit is configured to control flow paths through the air conditioning pack in different specific configurations based on one or more of a mode of operation of the vehicle and an ambient temperature outside of the vehicle.

Certain embodiments of the present disclosure provide a method for conditioning air for use in a vehicle. The method includes compressing, via a compressor, an air stream that includes bleed air received from a bleed air source to generate a compressed air stream. The method includes using a first portion of the compressed air stream from the compressor to power the compression of the air stream, and using a second portion of the compressed air stream to generate compressed ram air. The method also includes mixing the compressed ram air with one or more of the air stream upstream of the compressor or the compressed air stream downstream of the compressor to generate a hybrid air stream, and utilizing the hybrid air stream to regulate a temperature of at least one compartment in the vehicle.

DETAILED DESCRIPTION OF THE DISCLOSURE

Figure 1:
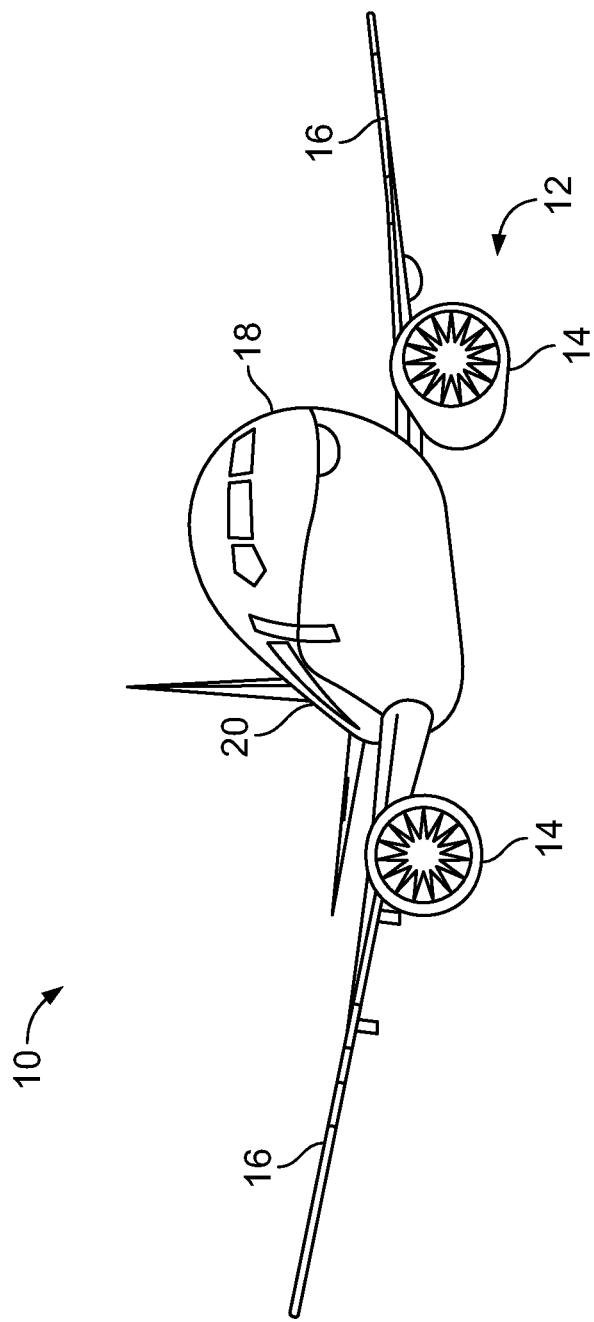
FIG. 1 illustrates a front perspective view of a vehicle according to an embodiment of the present disclosure.

Certain embodiments of the present disclosure include an air conditioning pack that is configured to cool and condition air. Compared to known air conditioning systems, the air conditioning pack in the embodiments described herein can extract less bleed air from a bleed air source, such as a gas turbine engine or an auxiliary power unit, while satisfying air conditioning requirements. Therefore, during operation of the vehicle, a greater percentage of compressed air generated within an engine can be used for vehicle propulsion. Furthermore, the air conditioning pack described herein may also require less ram air to be utilized during operation than known air conditioning systems, thereby reducing drag on the vehicle. Due to the reduced amounts of bleed air and ram air required for air conditioning, the air conditioning pack disclosed herein may increase the fuel economy and efficiency of the vehicle. The increased fuel economy and efficiency may result in longer ranges of the vehicle and reduced fuel costs.

The air conditioning pack according to the embodiments described herein includes an air cycle machine assembly that is fluidly and thermodynamically coupled to a cabin air compressor assembly via ductwork. The air cycle machine assembly is configured to pressurize an air stream that includes bleed air to generate a compressed air stream. The cabin air compressor assembly is configured to pressurize ram air to generate compressed ram air. The compressed ram air mixes with the bleed air in a mixing duct, either before or after the air stream is compressed by the air cycle machine assembly, to generate a hybrid air stream. The hybrid air stream may be discharged from the air conditioning pack and directed to one or more compartments of the vehicle. The hybrid air stream is temperature-controlled and may be utilized to provide cooling, ventilation, and/or pressurization within the vehicle.

The output of certain known air conditioning systems is typically only bleed air, such that ram air is solely used for cooling the bleed air and then is exhausted from the vehicle. However, the air conditioning pack according to the embodiments of the present disclosure outputs a hybrid air stream that is a mixture of both bleed air and ram air. Combining the bleed air with the compressed ram air can effectively limit the amount of bleed air utilized by the air conditioning pack. For example, the air conditioning pack described herein may use less bleed air than known air conditioning systems at all operating modes of the vehicle, and may also use less ram air than known air conditioning systems.

The air conditioning pack according to one or more embodiments of the present disclosure uses the pneumatic power of the bleed air extracted from a bleed air source of the vehicle to compress the ram air to a designated pressure. The air conditioning pack may fully exploit the energy potential of the bleed air by using the bleed air to simultaneously drive both the air cycle machine assembly and the cabin air compressor assembly. For example, the compressed air stream (which includes the bleed air) from the air cycle machine assembly may be split such that a first portion of the compressed air stream is directed to a turbine of the air cycle machine assembly to drive the compression of the bleed air, and a second portion of the compressed air stream is directed to a turbine of the cabin air compressor assembly to drive the compression of the ram air.

FIG. 1 illustrates a front perspective view of a vehicle 10 according to an embodiment of the present disclosure. The vehicle 10 in the illustrated embodiment is an aircraft, and is referred to herein as aircraft 10. Specifically, the aircraft 10 shown in FIG. 1 may be a commercial aircraft. An aircraft is one non-limiting example embodiment of the vehicle described herein, and the vehicle 10 in other embodiments of the present disclosure may be another type of transport vehicle, such as a rail vehicle, a bus, an automobile, a sea craft, or the like. For example, the air conditioning pack described in various embodiments herein may be installed on various different vehicles for controlling a temperature, pressure, and ventilation of air within the vehicles. The various different vehicles that may include the air conditioning pack include commercial aircraft such as the aircraft 10 shown in FIG. 1, but are not limited to commercial aircraft.

The aircraft 10 in the illustrated embodiment includes a propulsion system 12 with two main engines 14 for propelling the aircraft 10. The main engines 14 may be gas turbine (e.g., turbofan) engines. The main engines 14 may be carried by wings 16 of the aircraft 10. In other embodiments, the propulsion system 12 may include only one or more than two of the main engines 14, and/or the main engines 14 may be mounted to a fuselage 18 and/or an empennage 20 of the aircraft 10 instead of the wings 16. The fuselage 18 of the aircraft 10 defines an interior space 26 (shown in FIG. 2) that may include multiple compartments, such as a passenger cabin 28, a flight deck 30, a cargo area 32, and the like.

Figure 2:
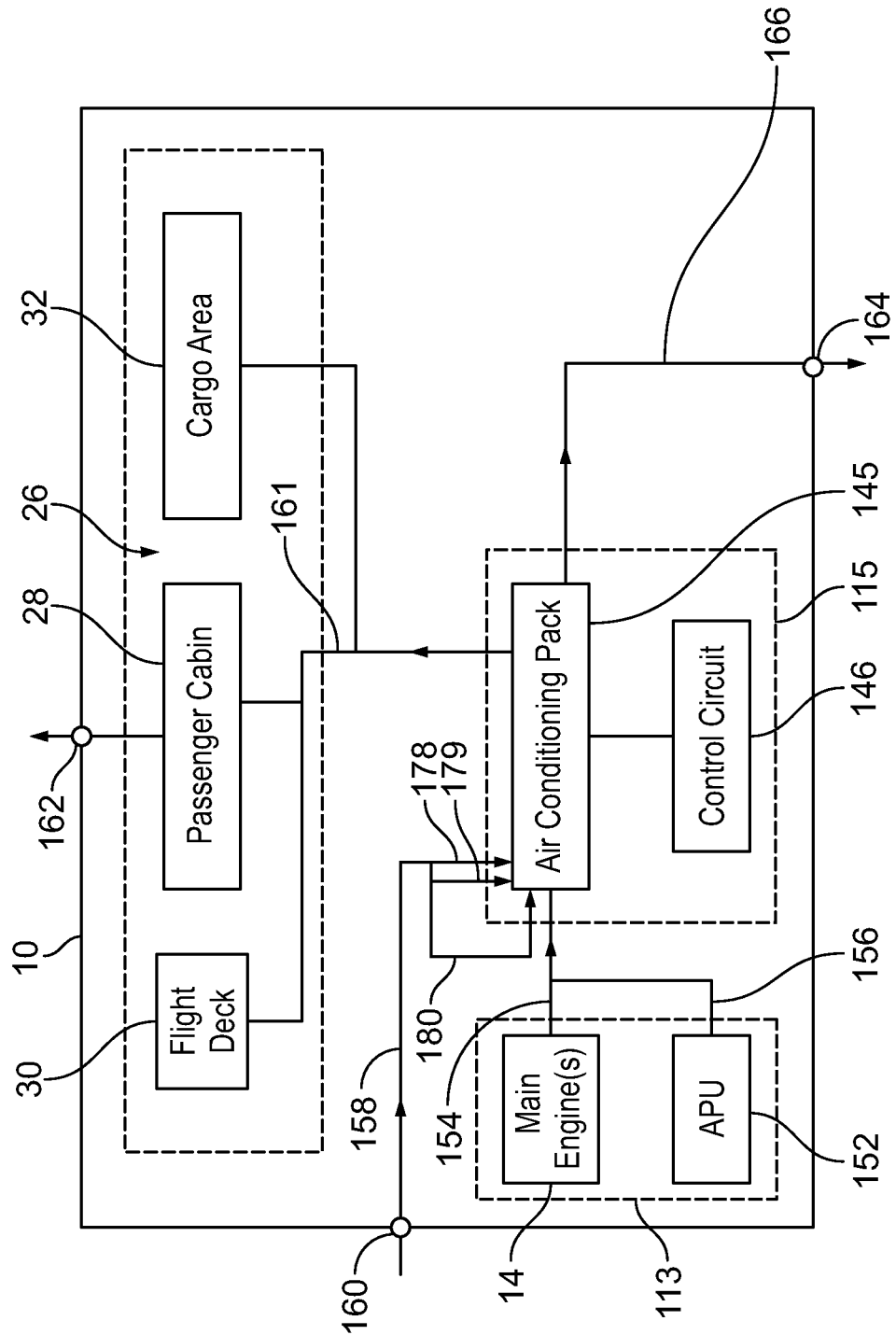
FIG. 2 is a schematic diagram of the vehicle according to an embodiment of the present disclosure.

FIG. 2 is a schematic diagram of the aircraft 10 according to an embodiment of the present disclosure. The diagram of the aircraft 10 in FIG. 2 shows components of the aircraft 10 that are used for generating and supplying conditioned air to the interior space 26 of the aircraft 10. For example, the aircraft 10 in the illustrated embodiment includes one or more bleed air sources 113 and a cooling system 115. The one or more bleed air sources 113 are configured to supply compressed air (e.g., referred to herein as bleed air) to the cooling system 115.

The cooling system 115 is configured to extract energy from the bleed air to produce the conditioned air that is provided for various cooling and/or ventilation tasks in the aircraft 10. At least some of the conditioned air from the cooling system 115 may be distributed within the interior space 26, such as within the passenger cabin 28 where passengers are located, the flight deck 30 where pilots and/or other crew members are located, and/or the cargo area 32 where cargo (e.g., pets, luggage, bulk items, etc.) is stored. The conditioned air may have a controlled temperature, pressure, and/or humidity. It is recognized that the components of the aircraft 10 illustrated in the diagram of FIG. 2 are relevant to air conditioning, and are not intended to represent all components, systems, devices, and the like of the aircraft 10.

The cooling system 115 includes an air conditioning pack 145 and a control circuit 146. The air conditioning pack 145 is a system with various air-handling and thermal management components and devices, such as heat exchangers, compressors, turbines, valves, and ducts, which are shown and described in detail with reference to FIGS. 3-6. The air conditioning pack 145 according to the embodiments described herein provides pressurization, ventilation, and temperature control for the aircraft 10 throughout an entire operational period of the aircraft 10. The air conditioning pack 145 may be configurable for use in a ground mode of operation of the aircraft 10 while the aircraft 10 is static at ground level, in a cruise flight mode of the operation of the aircraft 10 while the aircraft 10 is flying at cruise level, and any flight conditions or modes therebetween. For example, in one or more embodiments described herein, the air conditioning pack 145 is configurable in one or more ground configurations for use while the aircraft 10 is in the ground mode of operation, and is configurable in one or more cruise flight configurations for use while the aircraft 10 is in the cruise flight mode of operation.

The control circuit 146 is operatively connected to the air conditioning pack 145 and is configured to control operation of the air conditioning pack 145. For example, the control circuit 146 may be used to (i) open and close valves, (ii) activate and deactivate switches, motors, and/or fans, and (iii) monitor various parameters, such as system temperatures and pressures, aircraft compartment temperatures, external ambient temperatures, aircraft altitude, aircraft speed, and the like. The control circuit 146 may be configured to open and close particular valves to control flow paths (e.g., air flow paths) through the air conditioning pack 145 in different specific configurations of the air conditioning pack 145. The control circuit 146 may select or switch to one of the specific configurations of the air conditioning pack 145 based on various inputs received by the control circuit 146. As an example, the control circuit 146 may reconfigure the air flow paths through the air conditioning pack 145 based on different operating modes of the aircraft 10 (e.g., cruise flight or ground) and/or based on ambient environmental conditions outside of the aircraft 10. The ambient environment conditions may include an ambient temperature outside of the aircraft 10, an altitude of the aircraft 10, an ambient humidity outside of the aircraft 10, and/or the like.

The aircraft 10 in the illustrated embodiment includes multiple bleed air sources 113 that are configured to supply bleed air to the air conditioning pack 145 of the cooling system 115. Specifically, the aircraft 10 includes the main engines 14 and an auxiliary power unit 152 (abbreviated as "APU" in FIG. 2) that represent the bleed air sources 113. The main engines 14 receive air that is drawn into a compressor (not shown) of the respective main engine 14 from outside of the aircraft 10. The air is compressed by the compressor before flowing into a combustion chamber (not shown) where the air is combusted with fuel to generate thrust for propelling the aircraft 10. At least one of the main engines 14 includes a bleed port (not shown) along an intermediate stage of the compressor that is configured to allow bleed air to exit the main engine 14 prior to entering the combustion chamber. The bleed air from the at least one main engine 14 may be conveyed through a bleed air duct 154 to the air conditioning pack 145.

The auxiliary power unit 152 may be a gas turbine engine onboard the aircraft 10. The auxiliary power unit 152 generates power for non-tractive loads within the aircraft 10 rather than propelling the aircraft 10. The auxiliary power unit 152 may also generate pressurized bleed air for use by the air conditioning pack 145 during the ground mode of operation of the aircraft 10. For example, the auxiliary power unit 152 may supply power while the main engines 14 are off or idling, such as while the aircraft 10 is on the ground. Like the main engine 14, the auxiliary power unit 152 may pressurize air within a compressor (not shown) of the auxiliary power unit 152 to generate the bleed air. The auxiliary power unit 152 may also provide electricity and/or shaft power that can be used for main engine start and powering electrical loads (e.g., lights and instruments). The bleed air from the auxiliary power unit 152 may be conveyed through a bleed air duct 156 to the air conditioning pack 145. The bleed air duct 156 optionally may combine with the bleed air duct 154, as shown in FIG. 2. Although not shown in FIG. 2, the aircraft 10 may include valves along the bleed air ducts 154, 156 that control air flow through the bleed air ducts 154, 156. The valves may be controlled by the control circuit 146 of the cooling system 115 or by another control circuit on the aircraft 10. For example, in response to the aircraft 10 being in a ground mode of operation, the valves may be controlled to allow bleed air flow from the auxiliary power unit 152 through the bleed air duct 156 to the air conditioning pack 145, while blocking bleed air flow from the main engines 14 through the bleed air duct 154.

Figure 3:
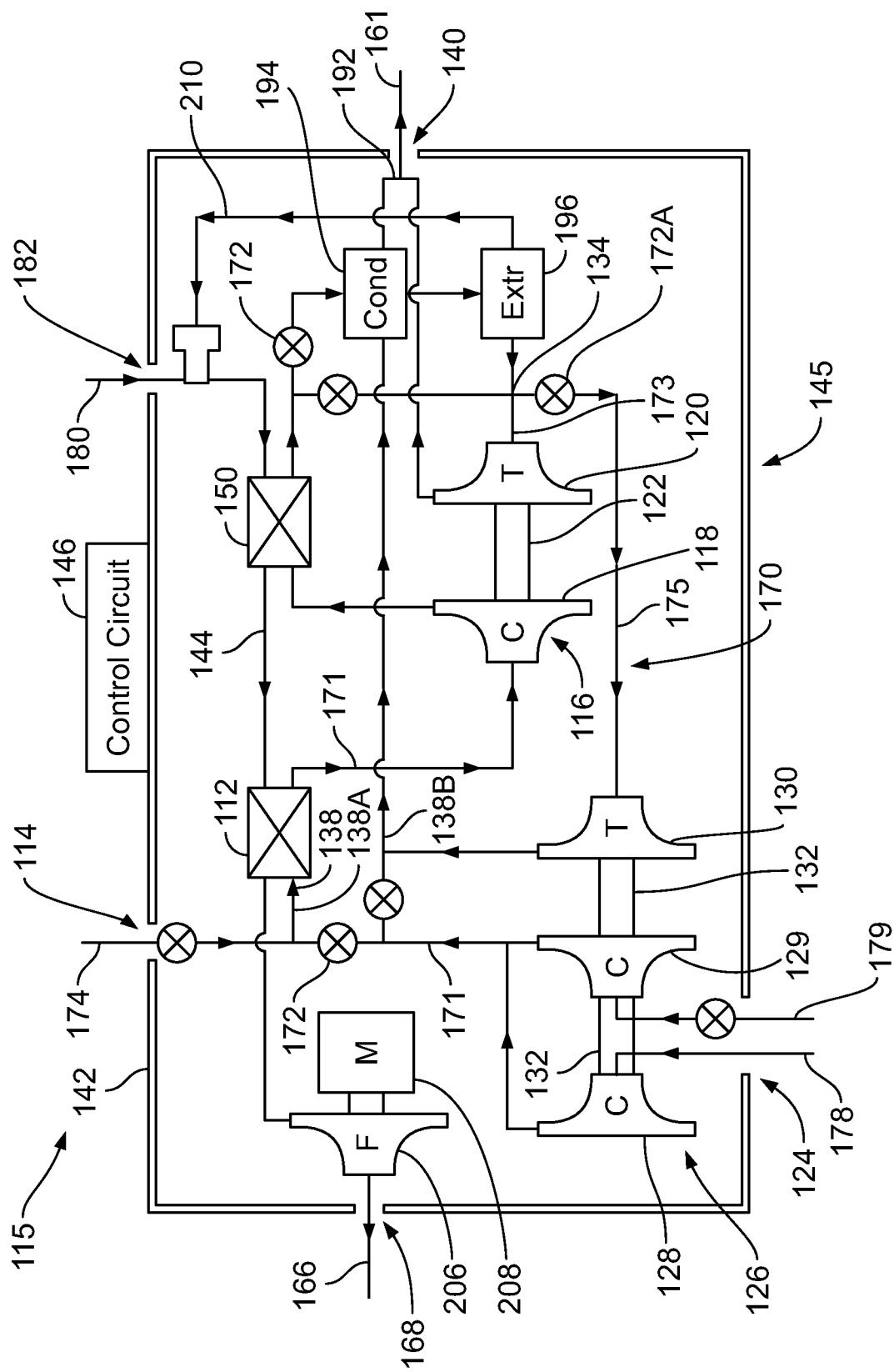
FIG. 3 is a schematic representation of a cooling system of the vehicle shown in FIGS. 1 and 2, according to an embodiment of the present disclosure.

The air conditioning pack 145 of the cooling system 115 receives ram air through a ram air duct 158 of the aircraft 10. The ram air duct 158 extends from a ram air intake 160 on an exterior surface of the aircraft 10 to the air conditioning pack 145. The ram air intake 160 may be a scoop or vent through which ram air enters the aircraft 10. The ram air is ambient air outside of the aircraft 10 that flows into the aircraft 10 due to the movement of the aircraft 10. In the illustrated embodiment, the ram air duct 158 of the aircraft 10 may split or branch into multiple inlet ducts, such as a first ram air inlet duct 178, a second ram air inlet duct 179, and a third ram air inlet duct 180. The first and second ram air inlet ducts 178, 179 connect to the air conditioning pack 145 through a ram air inlet port 124 (shown in FIG. 3), and are configured to supply ram air to a cabin air compressor assembly 126 (FIG. 3). The third ram air inlet duct 180 connects to the air conditioning pack 145 at a heat sink inlet port 182 (FIG. 3) and is in flow communication with a ram air heat sink circuit 144 (FIG. 3).

The air conditioning pack 145 extracts energy from the bleed air for compressing the ram air. The ram air mixes with the bleed air within the air conditioning pack 145 to define a hybrid air stream. The hybrid air stream is discharged from the air conditioning pack 145 as conditioned air that is distributed via one or more supply air ducts 161 to the passenger cabin 28, flight deck 30, cargo area 32, and/or other compartments within the interior space 26 of the aircraft 10. The hybrid air stream is conditioned by the air conditioning pack 145 to provide temperature control, humidity control, ventilation, and/or pressurization within the aircraft 10. The hybrid air stream may blend with the air within the passenger cabin 28 and optionally may be discharged from the aircraft 10 through an outflow port 162 of the aircraft 10. In one or more embodiments, some of the ram air received within the air conditioning pack 145 from the ram air duct 158 is not compressed, but rather is used for absorbing heat within the air conditioning pack 145. For example, this portion of ram air may be used to absorb heat from the bleed air. The portion of the ram air used to absorb heat exits the air conditioning pack 145 through an exhaust duct 166 to an exhaust port 164 of the aircraft 10, where the heated ram air is expelled from the aircraft 10.

In one or more embodiments, the air conditioning pack 145 may be a unitary, integral system, such that the components of the air conditioning pack 145 may be commonly disposed within a single housing or case. Optionally, the control circuit 146 may be located within the housing, may be mounted on an exterior surface of the housing, or may be installed remotely from the air conditioning pack 145. The air conditioning pack 145 may be sufficiently compact and lightweight to be hand carried. As a result, the air conditioning pack 145 may be relatively simple to install within an aircraft 10 or another vehicle containing an existing bleed-air based air conditioning system by loading the air conditioning pack 145 into position and making corresponding connections among ductwork, mechanical fasteners, electrical components, and the like.

Figure 4:
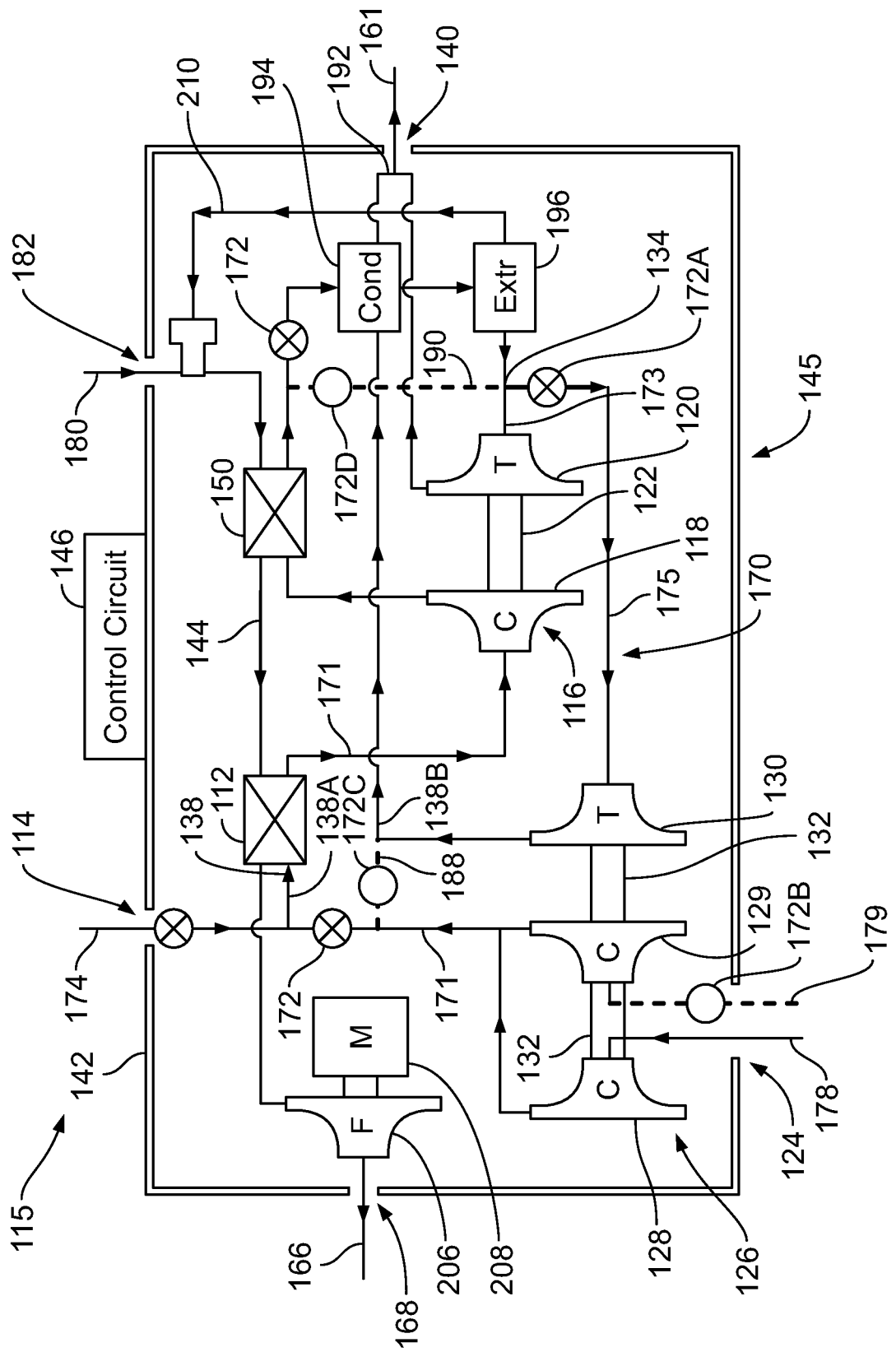
FIG. 4 is a schematic diagram of the cooling system of FIG. 3 showing an air conditioning pack thereof in a first ground configuration.
Figure 5:
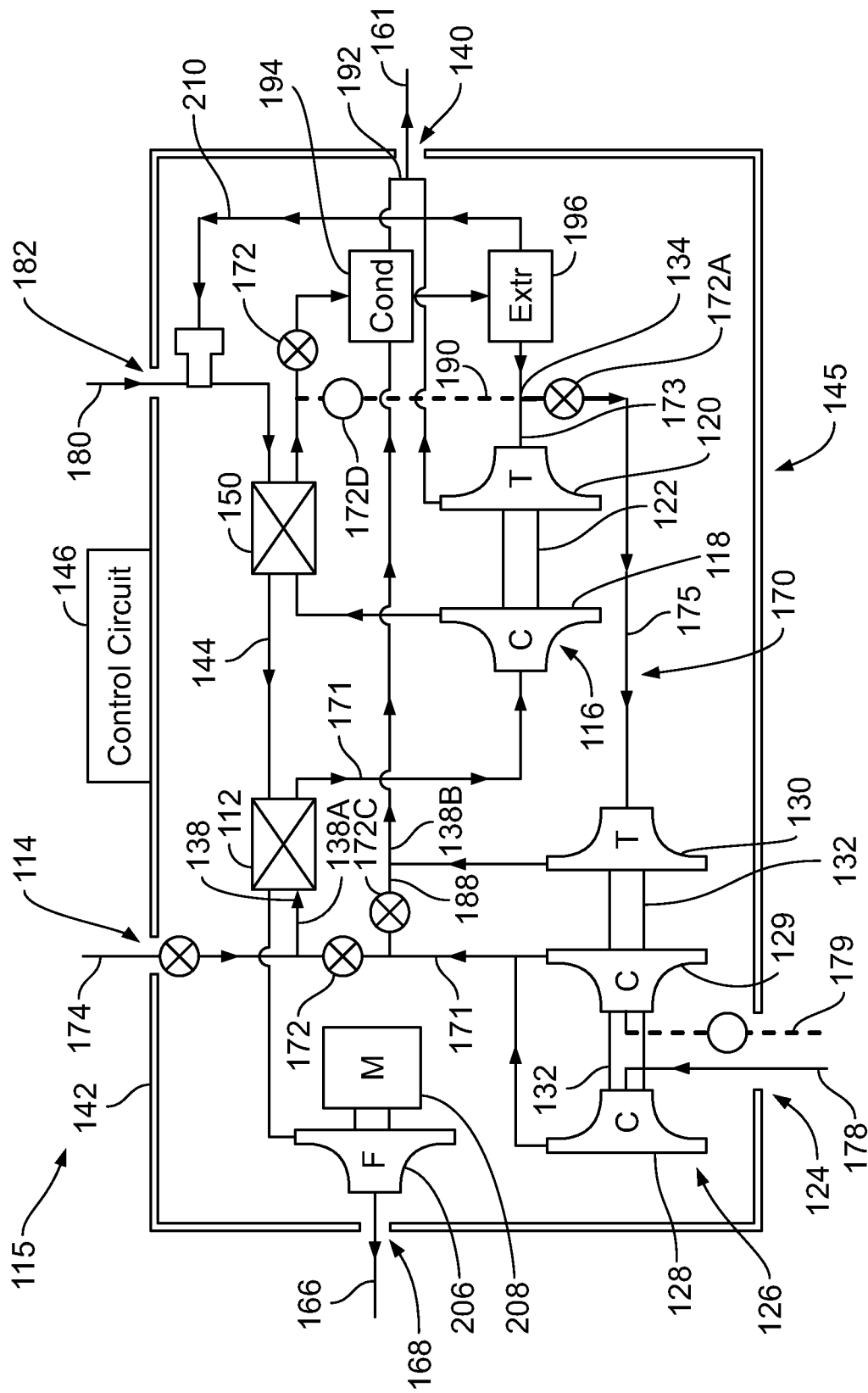
FIG. 5 is a schematic diagram of the cooling system of FIGS. 3 and 4 showing the air conditioning pack in a second ground configuration.

In the one or more ground configurations, the air conditioning pack 145 may supply conditioned air within the interior space 26 of the aircraft 10 while the aircraft is on the ground. For example, the conditioned air may comfort the passengers while loading and unloading the passenger cabin 28, and may comfort the flight crew while preparing for an upcoming flight or cleaning after a previous flight. Various ground configurations of the air conditioning pack 145 are shown and described with reference to FIGS. 4 and 5. For example, FIG. 4 represents a first ground configuration, and FIG. 5 represents a second ground configuration. In both the first and second ground configurations, the auxiliary power unit 152 of the aircraft 10 is used to supply bleed air to the air conditioning pack 145. The air conditioning pack 145 uses the bleed air to compress ram air such that the pressure of the ram air is substantially the same as the pressure of the bleed air received from the auxiliary power unit 152. The pressure of the ram air may be substantially the same as the pressure of the bleed air received from the auxiliary power unit 152 within a designated range of the bleed air pressure (e.g., within 1%, 5%, or 10% of the bleed air pressure). The air flow paths through the air conditioning pack 145 are configured such that incoming bleed air mixes with the compressed ram air, and the bleed and compressed ram air streams are cooled together within the air conditioning pack 145. The first ground configuration may be used when the temperature of the ambient environment outside of the aircraft 10 at ground level is at or above a designated threshold temperature. The second ground configuration shown in FIG. 5 has a slightly different flow path than the first ground configuration, and may be used when the ambient temperature is less than the designated threshold temperature.

In the one or more cruise flight configurations, the air conditioning pack 145 may supply conditioned air for pressurization, temperature control, and ventilation of the interior space 26 of the aircraft 10 during the cruise flight mode of operation of the aircraft 10 (e.g., while flying at a designated cruise altitude). One cruise flight configuration of the air conditioning pack 145 is shown and described with reference to FIG. 6. Although only one cruise flight configuration is shown in the illustrated embodiments, the air conditioning pack 145 may be configurable in additional cruise flight configurations in other embodiments, as described herein. In each cruise flight configuration, at least one of the main engines 14 of the aircraft 10 is used to supply bleed air to the air conditioning pack 145. The air conditioning pack 145 uses the bleed air to compress the ram air such that the pressure of the ram air is substantially the same as the pressure of the passenger cabin 28. The pressure of the ram air may be substantially the same as the pressure of the passenger cabin 28 within a designated range of the cabin air pressure (e.g., within 1%, 5%, or 10% of the cabin air pressure). In the cruise flight configuration, the compressed ram air does not mix with the bleed air as in the ground configurations, but instead mixes with and is cooled by the ram air power turbine discharge air. The bleed air does, however, mix with the compressed ram air prior to discharge from the air conditioning pack 145, such that the output air stream includes both bleed air and compressed ram air, similar to the ground configurations.

The control circuit 146 is configured to control (e.g., select and switch between) the different configurations of the air conditioning pack 145. The control circuit 146 includes and/or represents one or more hardware circuits or circuitry that include, are connected with, or that both include and are connected with one or more processors, controllers, and/or other hardware logic-based devices. The control circuit 146 may include a central processing unit (CPU), one or more microprocessors, a graphics processing unit (GPU), or any other electronic component capable of processing inputted data according to specific logical instructions. For example, the control circuit 146 may execute instructions stored on a tangible and non-transitory computer readable storage medium (e.g., a memory device). For example, the control circuit 146 may be configured to activate or deactivate certain valves in the air conditioning pack 145 to alter the flow paths according to instructions stored on a memory device in response to certain triggering events. Triggering events may include an input received from an operator input device (e.g., an operator manually selecting a specific configuration of the air conditioning pack 145 via a keyboard, handheld input device, or the like). Other triggering events for the control circuit 146 to reconfigure the flow path of the air conditioning pack 145 may be based on detected operating conditions of the aircraft 10 and/or detected ambient environmental conditions, as described in more detail herein. The control circuit 146 may be operatively connected to the air conditioning pack 145 via one or more wired control lines or wireless communication links, such that the control circuit 146 may communicate control signals wirelessly or along wired paths to various valves, air movers (e.g., fans), and other devices of the air conditioning pack 145.

FIG. 3 is a schematic representation of the cooling system 115 of the aircraft 10 shown in FIGS. 1 and 2, according to an embodiment of the present disclosure. FIG. 3 illustrates a non-limiting example of the system architecture of the air conditioning pack 145. The air conditioning pack 145 includes an air cycle machine assembly 116, a cabin air compressor assembly 126 for compressing ram air, and one or more mixing ducts 138. The air cycle machine assembly 116 is driven by bleed air, and the cabin air compressor assembly 126 is driven by a power turbine 130. The air cycle machine assembly 116 is referred to herein as ACM assembly 116, and the cabin air compressor assembly 126 is referred to herein as CAC assembly 126. The ACM assembly 116, the CAC assembly 126, and the one or more mixing ducts 138 are disposed along an air conditioning flow circuit 170 of the air conditioning pack 145. The air conditioning flow circuit 170 is defined by a series of interconnected ducts 171 configured to direct air flow along defined paths. The term "ducts" is intended to broadly include various air-handling members, such as conduits, chutes, tubes, hoses, and the like. The ducts 171 direct the flow of bleed air and ram air between the components and devices in the air conditioning pack 145. The air conditioning pack 145 also includes a ram air heat sink circuit 144 discrete from the air conditioning flow circuit 170. The ram air heat sink circuit 144 conveys an air stream that is configured to absorb heat from air within the air conditioning flow circuit 170.

The air conditioning pack 145 includes multiple valves 172 disposed along the ducts 171 of the air conditioning flow circuit 170. The valves 172 are configured to be selectively opened and closed to control the flow paths of the air streams through the air conditioning flow circuit 170. The control circuit 146 may control the states or positions of the valves 172 by communicating control signals to the valves 172. The control circuit 146 may communicate the control signals to the corresponding valves 172 wirelessly and/or through conductive wires. In FIGS. 3-6, the valves 172 with an "X" represent open or at least partially open valves 172 that allow fluid flow therethrough, and the valves 172 that are blank circles (e.g., lacking an "X") represent closed valves 172 that block fluid flow therethrough. Although all of the valves 172 are depicted in the open position, FIG. 3 optionally does not represent any of the specific configurations of the air conditioning pack 145 that would be employed in operation of the aircraft 10.

The ACM assembly 116 includes a compressor 118 and a turbine 120 that are mechanically coupled to each other via a shaft 122. For example, rotation of the turbine 120 causes the shaft 122 to rotate, which drives rotation of the compressor 118. The compressor 118 and the turbine 120 may each include one or more stages of rotational blades and stationary vanes (not shown). In one or more embodiments described herein, the compressor 118 of the ACM assembly 116 is configured to receive an air stream that includes bleed air. The air stream may include compressed ram air with the bleed air or just bleed air, depending on the selected configuration of the air conditioning pack 145. The compressor 118 pressurizes the air stream to generate a compressed air stream. The ACM assembly 116 is further configured to utilize a portion of the compressed air stream that exits the compressor 118 in order to power the compressor 118. For example, the portion of the compressed air stream used to power the compressor 118 is directed to the turbine 120 and is expanded through the turbine 120. The turbine 120 extracts energy from the compressed air stream, which is used as pneumatic power to drive rotation of the compressor 118 via the shaft 122.

The CAC assembly 126 in the illustrated embodiment includes a first cabin air compressor 128, a second cabin air compressor 129, and a turbine 130 that are mechanically coupled to each other via a shaft 132. The CAC assembly 126 is spaced apart from the ACM assembly 116, such that the shaft 132 is separate from the shaft 122 of the ACM assembly 116.

The CAC assembly 126 is configured to receive another portion of the compressed air stream from the compressor 118 of the ACM assembly 116. For example, a first portion of the compressed air stream is directed to the turbine 120 of the ACM assembly 116, and a discrete, second portion of the compressed air stream is directed to the CAC assembly 126. The CAC assembly 126 utilizes the second portion of the compressed air to generate compressed ram air. For example, depending on the selected configuration of the air conditioning pack 145, one or both of the cabin air compressors 128, 129 receive ram air and compress the ram air to generate the compressed ram air. The second portion of the compressed air stream from the compressor 118 is directed through the turbine 130 of the CAC assembly 126. The turbine 130 expands and extracts energy from the compressed air stream passing through the turbine 130. The extracted energy is used as pneumatic power to drive rotation of one or both of the cabin air compressors 128, 129 via the shaft 132.

The one or more mixing ducts 138 represent ducts 171 in the air conditioning flow circuit 170 that are configured to receive both the compressed ram air and an air stream containing bleed air therein. For example, depending on the location of the mixing duct 138, the mixing duct 138 may receive the air stream containing bleed air upstream of the compressor 118 or may receive the compressed air stream containing bleed air downstream of the compressor 118. The mixing duct 138 allows the compressed ram air to mix with either the bleed air stream and/or the compressed bleed air stream to define a hybrid air stream including both ram air and bleed air. The hybrid air stream is used for cooling at least a portion of the aircraft 10 after mixing with the exhaust from the turbine 120. In the illustrated embodiment, the air conditioning pack 145 includes a first mixing duct 138A and a second mixing duct 138B. The first mixing duct 138A is upstream of the compressor 118 of the ACM assembly 116 along a direction of flow of air through the air conditioning flow circuit 170. The first mixing duct 138A receives an air stream containing bleed air that enters the air conditioning pack 145 via a bleed air inlet duct 174. The first mixing duct 138A also receives compressed ram air exiting one or both of the cabin air compressors 128, 129 of the CAC assembly 126. Because the first mixing duct 138A is upstream of the compressor 118, the hybrid air stream generated within the first mixing duct 138A is directed to the compressor 118 of the ACM assembly 116.

The second mixing duct 138B is downstream of the compressor 118 of the ACM assembly 116. The second mixing duct 138B receives the compressed bleed air stream after it has exited the compressor 118 of the ACM assembly 116 and passed through the turbine 130 of the CAC assembly 126. The second mixing duct 138B also receives the compressed ram air exiting one or both of the cabin air compressors 128, 129 of the CAC assembly 126. The hybrid air stream generated within the second mixing duct 138B may be subsequently mixed with air exhausted from the turbine 120 and discharged from the air conditioning pack 145 for cooling at least a portion of the aircraft 10. Depending on the selected configuration of the air conditioning pack 145, the compressed air stream may mix with the bleed air in only one or both of the mixing ducts 138A, 138B, as described in more detail herein.

The air conditioning pack 145 may also include a splitter 134 located downstream of the compressor 118 of the ACM assembly 116. The splitter 134 is disposed between the compressor 118 and the turbine 120 of the ACM assembly 116. For example, the splitter 134 is downstream of the compressor 118 and upstream of the turbine 120. The splitter 134 is configured to divide an incoming air stream from a single duct 171 into two outgoing air streams along different ducts 171. For example, the splitter 134 receives the compressed air stream from the compressor 118, and divides the compressed air stream into the first and second portions of the compressed air stream. The first portion of the compressed air stream is conveyed along a first branch duct 173 to the turbine 120 of the ACM assembly 116, and the second portion of the compressed air stream is conveyed along a second branch duct 175 to the turbine 130 of the CAC assembly 126. The first and second portions of the compressed air stream are discrete and separate from each other. The splitter 134 may be a fitting between ducts 171, a specially-designed duct, or an insert within a duct 171.

A splitter valve 172A may be disposed at or proximate to the splitter 134 to control how the compressed air stream is divided between the first and second portions at the splitter 134. For example, the splitter valve 172A in the illustrated embodiment is disposed along the second branch duct 175. Adjusting the splitter valve 172A to increase the mass flow rate of the compressed air stream through the splitter valve 172A increases the mass flow rate of the second portion that is directed to the turbine 130 of the CAC assembly 126 and decreases the mass flow rate of the first portion that is directed to the turbine 120 of the ACM assembly 116. Inversely, reducing the opening of the splitter valve 172A decreases the mass flow rate of the second portion and increases the mass flow rate of the first portion. In an alternative embodiment, the splitter valve 172A may be disposed along the first branch duct 173 instead of the second branch duct 175, or the splitter valve 172A along the second branch duct 175 is utilized with a second valve along the first branch duct 173.

In at least one embodiment, the air conditioning pack 145 includes a housing 142 or case, and at least some of the components of the air conditioning pack 145 are disposed within the housing 142. For example, in the illustrated embodiment, the ACM assembly 116, the CAC assembly 126, and the mixing ducts 138A, 138B are disposed within the housing 142, along with the interconnecting ducts 171. A portion of the ram air heat sink circuit 144 may also be disposed within the housing 142. For example, the housing 142 includes a heat sink inlet port 182 to enable ram air to be channeled from a ram air inlet duct 180 to the portion of the ram air heat sink circuit 144 disposed within the housing 142. The housing 142 may be composed of a rigid material, such as one or more plastics and/or metals. The control circuit 146 is mounted on or to the housing 142 in the illustrated embodiment, but the control circuit 146 may be disposed within the housing 142 or located remote from the housing 142 (e.g., outside of and spaced apart from the housing 142) in other embodiments. In an alternative embodiment, the air conditioning pack 145 may lack the housing 142 or at least a portion of the ACM assembly 116 and/or the CAC assembly 126 may be disposed outside of the housing 142.

In the illustrated embodiment, the air conditioning pack 145 includes a first heat exchanger 112 and a second heat exchanger 150. Both of the heat exchangers 112, 150 provide heat transfer between the air conditioning flow circuit 170 and the ram air heat sink circuit 144. Heat is rejected from the air conditioning flow circuit 170 into the ram air heat sink circuit 144 at the heat exchangers 112, 150. In the illustrated embodiment, the first and second heat exchangers 112, 150 are arranged in series along the air conditioning flow circuit 170 on opposite sides of the compressor 118 of the ACM assembly 116. The first heat exchanger 112 receives the air stream that includes the bleed air upstream of the compressor 118. The first heat exchanger 112 is used to reduce an operating temperature of the air stream prior to the air stream entering the compressor 118. The compressor 118 of the ACM assembly 116 receives the air stream from the first heat exchanger 112. The compressed air stream exiting the compressor 118 flows through the second heat exchanger 150. For example, the second heat exchanger 150 is disposed along the flow path between the compressor 118 and the splitter 134. The second heat exchanger 150 is used to reduce the operating temperature of the compressed air stream prior to the compressed air stream reaching the splitter 134 and dividing into the first and second portions.

The housing 142 of the air conditioning pack 145 includes a bleed air inlet port 114 that is in flow communication with the first heat exchanger 112 via the bleed air inlet duct 174. The bleed air inlet duct 174 is connected to (or an extension of) the bleed air ducts 154, 156 (shown in FIG. 2) that extend from the one or more bleed air sources 113. Bleed air from the one or more bleed air sources 113 is conveyed into the air conditioning pack 145 through the bleed air inlet port 114. The housing 142 also includes an outlet port 140 through which the hybrid air stream exits the air conditioning pack 145. The hybrid air stream is mixed with air exiting turbine 120 of the ACM assembly 116. The resulting air stream is discharged through the outlet port 140 and flows through the supply air ducts 161 to the interior space 26 (shown in FIG. 2) of the aircraft 10.

The air conditioning flow circuit 170 receives ram air via the first and second ram air inlet ducts 178, 179 extend through the ram air inlet port 124 in the housing 142. The first ram air inlet duct 178 is fluidly connected to the first cabin air compressor 128 of the CAC assembly 126, and the second ram air inlet duct 179 is fluidly connected to the second cabin air compressor 129 of the CAC assembly 126. The ram air that flows through the first and second ram air inlet ducts 178, 179 is compressed by the cabin air compressors 128, 129, respectively, of the CAC assembly 126 to generate the compressed ram air. For example, a first ram air stream in the first ram air inlet duct 178 may be compressed by the first cabin air compressor 128, and a different, second ram air stream in the second ram air inlet duct 179 may be compressed by the second cabin air compressor 129. The compressed ram air exiting the CAC assembly 126 may be generated by one or both of the cabin air compressors 128, 129.

The air stream that flows through the third ram air inlet duct 180 is conveyed through the ram air heat sink circuit 144 and absorbs heat from air within the air conditioning flow circuit 170 at the first and second heat exchangers 112, 150. The ram air heat sink circuit 144 may include a fan 206 that drives air flow through the ram air heat sink circuit 144 to ensure that the flow rate of the air stream is sufficient to dissipate a designated amount of heat from the air conditioning flow circuit 170. The fan 206 is driven by a motor 208. After flowing through the heat exchangers 112, 150, the air stream within the ram air heat sink circuit 144 is discharged from the air conditioning pack 145 through a heat sink outlet 168 in the housing 142. The discharged air stream flows through the exhaust duct 166 (shown in FIG. 2) before being dispelled from the aircraft 10 through the exhaust port 164 (FIG. 2).

The air conditioning pack 145 also includes a condenser 194 and a water extractor 196 disposed along the air conditioning flow circuit 170 between the compressor 118 of the ACM assembly 116 and the turbines 120, 130 of the ACM and CAC assemblies 116, 126, respectively. More specifically, the condenser 194 and the water extractor 196 are disposed in series between the second heat exchanger 150 and the splitter 134. The water extractor 196 may be a high pressure water separator configured to remove moisture from the compressed air stream. Water extracted from the compressed air stream is carried through the water conduit 210 and is reinjected at the ram air heat sink circuit 144 upstream of the second heat exchanger 150 to provide an additional heat sink for the system.

FIG. 4 is a schematic diagram of the cooling system 115 showing the air conditioning pack 145 in a first ground configuration. As described above, the air conditioning pack 145 is configurable in various configurations by the control circuit 146 individually controlling the states or positions of the valves 172 along the air conditioning flow circuit 170. The control circuit 146 controls the states of the valves 172 by communicating electrical control signals to the valves 172 along wired paths or via wireless communication links. The air conditioning pack 145 may be configurable in multiple different ground configurations. In at least one embodiment, the control circuit 146 is configured to select or maintain the air conditioning pack 145 in one of the ground configurations in response to the aircraft 10 being on the ground.

The air conditioning pack 145 achieves the first ground configuration when the control circuit 146 closes a cabin air compressor valve 172B, a hot bypass valve 172C, and a condenser bypass valve 172D. The cabin air compressor valve 172B is disposed along the second ram air inlet duct 179, and closing the cabin air compressor valve 172B blocks the flow of ram air to the second cabin air compressor 129 of the CAC assembly 126. As a result, the second cabin air compressor 129 does not receive ram air and does not generate compressed ram air when in the first ground configuration. The hot bypass valve 172C is disposed along a hot bypass duct 188 that is disposed downstream of the cabin air compressors 128, 129 of the CAC assembly 126 and upstream of the first mixing duct 138A and the first heat exchanger 112. Closing the hot bypass valve 172C ensures that all of the compressed ram air from the CAC assembly 126 is directed to the first mixing duct 138A.

Figure 6:
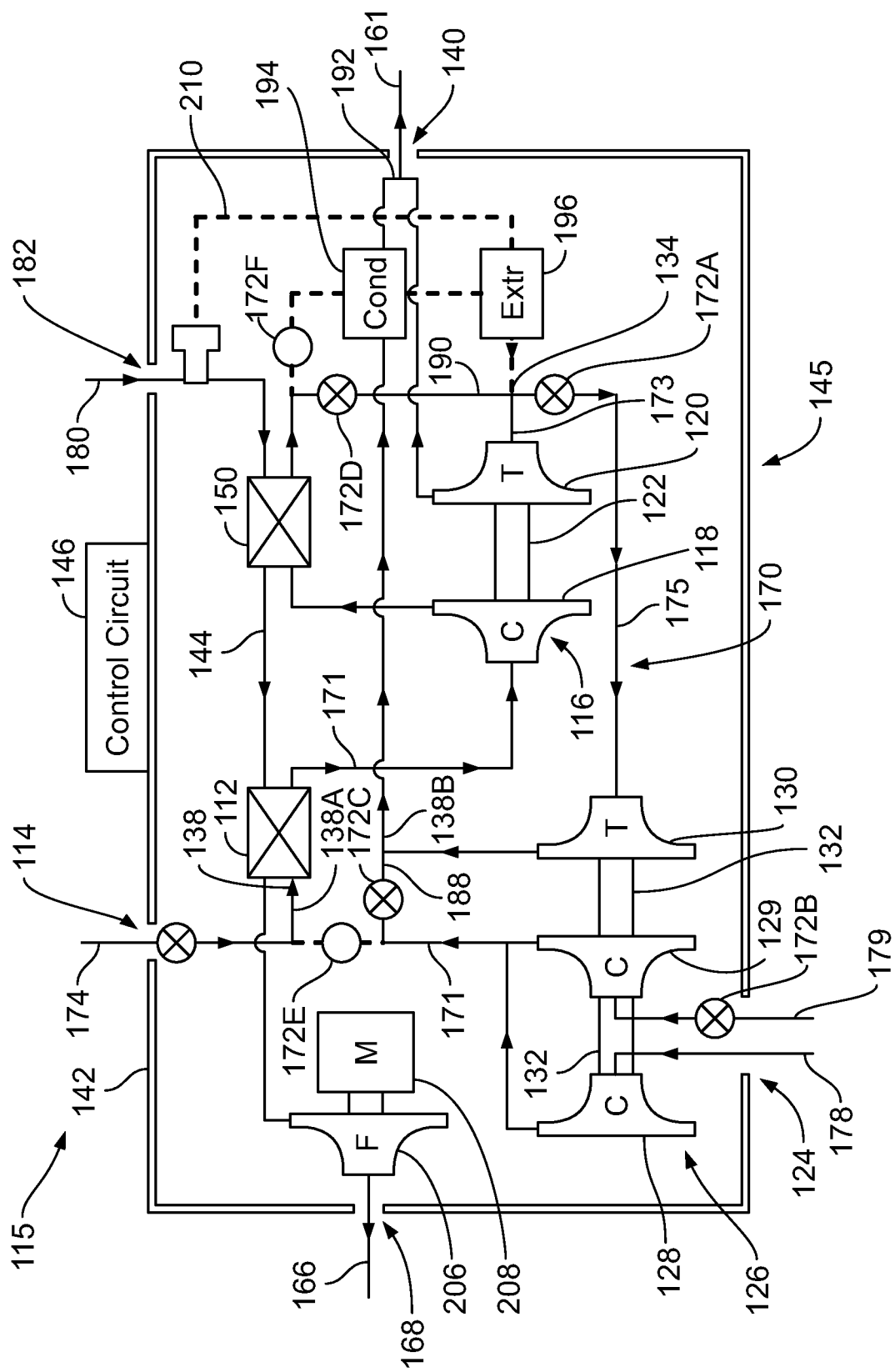
FIG. 6 is a schematic diagram of the cooling system of FIGS. 3 to 5 showing the air conditioning pack in a cruise flight configuration.

The condenser bypass valve 172D is disposed along a condenser bypass duct 190 that is disposed downstream of the compressor 118 and the second heat exchanger 150, and upstream of the condenser 194, the water extractor 196, and the splitter 134. Closing the condenser bypass valve 172D ensures that all of the compressed air stream from the compressor 118 and the second heat exchanger 150 flows through the condenser 194 and the water extractor 196 before reaching the splitter 134. The other valves 172 disposed along the air conditioning flow circuit 170 in the illustrated embodiment are set or retained in the open position in the first ground configuration to allow air flow therethrough along the flow path described below. As shown in FIGS. 4-6, solid flow lines represent flow lines that have fluid flow therethrough, and dotted flow lines represent flow lines with no fluid flow therethrough. In FIG. 4, because the cabin air compressor valve 172B, the hot bypass valve 172C, and the condenser bypass valve 172D are closed, no fluid flows through the second ram air inlet duct 179, the hot bypass duct 188, or the condenser bypass duct 190, which are shown as dotted lines.

When the air conditioning pack 145 is in the first ground configuration, the air conditioning pack 145 receives bleed air from the auxiliary power unit 152 (shown in FIG. 2). The first cabin air compressor 128 of the CAC assembly 126 receives the ram air through the first ram air inlet duct 178 to generate the compressed ram air. The second cabin air compressor 129 does not receive ram air, so only the first cabin air compressor 128 generates the compressed ram air. In an embodiment, the CAC assembly 126 may compress the ram air to be substantially the same as the pressure of the bleed air received from the auxiliary power unit 152 within a designated range of the bleed air pressure (e.g., within 1%, 5%, or 10% of the bleed air pressure). The compressed ram air from the first cabin air compressor 128 is directed to the first mixing duct 138A. In the first mixing duct 138A, the compressed ram air mixes with the air stream containing bleed air supplied from the auxiliary power unit 152 to define the hybrid air stream.

The hybrid air stream flows from the mixing duct 138A through the first heat exchanger 112, where heat from the hybrid air stream is transferred to the air stream within the ram air heat sink circuit 144 to cool the hybrid air stream. The hybrid air stream is subsequently compressed by the compressor 118 of the ACM assembly 116 to define the compressed air stream. The compression heats the air, so the compressed air stream exiting the compressor 118 is directed through the second heat exchanger 150 to cool the compressed air stream.

The compressed air stream is directed from the second heat exchanger 150 through the condenser 194 followed by the water extractor 196. The condenser 194 provides additional cooling for the compressed air stream to ensure that the operating temperature of the compressed air stream entering the water extractor 196 is sufficiently cool to condense some of the water in the air to a liquid prior to entering the water extractor 196. The water extracted from the compressed air stream in the water extractor 196 is directed through a water conduit 210 and injected into the ram air heat sink circuit 144 to increase the cooling effectiveness of the air stream within the ram air heat sink circuit 144.

After exiting the water extractor 196, the compressed air stream is divided into the first and second portions at the splitter 134. The first portion is expanded through the turbine 120 of the ACM assembly 116 to power the compressor 118. For example, the energy of the compressed air stream flowing through the rotor blades and vanes of the turbine 120 drives the rotation of the compressor 118 via the shaft 122, and cools the compressed air stream in the process. The second portion of the compressed air stream is directed to the CAC assembly 126 and is expanded through the turbine 130 to power the first cabin air compressor 128. Therefore, the compressed air stream, which is the hybrid air stream in the first ground configuration, is used to simultaneously power the compressor 118 of the ACM assembly 116 and the first cabin air compressor 128 of the CAC assembly 126.

The first and second portions of the compressed air stream are cooled within the corresponding turbines 120, 130. In the illustrated embodiment, the second portion of the compressed air stream exiting the turbine 130 is directed through the condenser 194 and absorbs heat from the compressed air stream that is upstream of the splitter 134 and the water extractor 196. Thus, the second portion of the compressed air stream is heated within the condenser 194. The first and second portions of the compressed air stream converge after exiting the corresponding turbines 120, 130. In the illustrated embodiment, the second portion converges with the first portion at a mixing duct 192 that is between the condenser 194 and the outlet port 140 of the air conditioning pack 145. The air conditioning pack 145 is configured to condition the hybrid air stream to a designated temperature, pressure, and humidity. In a non-limiting example, the hybrid air stream discharged along the supply air duct 161 may have a temperature below 32 degrees Fahrenheit (° F.) (0 degrees Celsius (° C.)), such as between 0 and 20° F. (−17.8 and −6.7° C.).

In the first ground configuration, the fan 206 is driven by the motor 208 to propel the air stream through the ram air heat sink circuit 144 at a desired flow rate to provide a desired amount of heat dissipation from the air within the air conditioning flow circuit 170 at the heat exchangers 112, 150. The operation of the motor 208 optionally may represent the only power requirement of the air conditioning pack 145, aside from the electrical energy powering the control circuit 146 and the energy expended to generate the bleed air that is supplied to the air conditioning pack 145.

FIG. 5 is a schematic diagram of the cooling system 115 showing the air conditioning pack 145 in a second ground configuration. The difference between the first and second ground configurations is that the hot bypass valve 172C is at least partially open in the second ground configuration shown in FIG. 5 instead of fully closed as in the first ground configuration. The control circuit 146 partially opens the hot bypass valve 172C to allow some of the compressed ram air exiting the first cabin air compressor 128 of the CAC assembly 126 to flow through the hot bypass duct 188, bypassing the first mixing duct 138A, both of the heat exchangers 112, 150, and the ACM assembly 116. A first portion of the compressed ram air that does not flow through the hot bypass duct 188 follows the flow path described with reference to the first ground configuration shown in FIG. 4. For example, the first portion of the compressed ram air mixes with the air stream in the first mixing duct 138A to define at least a portion of the hybrid air stream.

A second portion of the compressed ram air that flows through the hot bypass duct 188 does not get compressed by the ACM assembly 116 and is not directed to either of the turbines 120, 130. Rather, the second portion of the compressed ram air mixes with the second portion of the compressed air stream that exits the turbine 130 of the CAC assembly 126 within the second mixing duct 138B to define the hybrid air stream. In an embodiment, the first portion of the compressed ram air that is directed to the first mixing duct 138A has a greater mass flow rate than the second portion of the compressed ram air that is directed through the hot bypass duct 188. Thus, a majority of the compressed ram air from the CAC assembly 126 is directed to the first mixing duct 138A instead of through the hot bypass duct 188. In a non-limiting example, the mass flow rate of the first portion may be at least eight times greater than the mass flow rate of the second portion directed through the hot bypass duct 188.

The control circuit 146 may partially open the hot bypass valve 172C in order to raise the temperature of the hybrid air stream exiting the air conditioning pack 145 (relative to not directing any of the compressed ram air through the hot bypass duct 188). For example, the second portion of the compressed ram air exiting from the first cabin air compressor 128 is at a higher temperature than the second portion of the compressed air stream exiting the turbine 130 of the CAC assembly 126, so the compressed ram air directed through the hot bypass duct 188 to the second mixing duct 138B increases the temperature of the hybrid air stream. The hybrid air stream subsequently flows through the condenser 194.

In at least one embodiment, the control circuit 146 may be configured to switch between the first and second ground configurations in response to one or more designated conditions or circumstances, such as a measured temperature of the ambient environment outside of the aircraft 10 while the aircraft 10 is on the ground. For example, if the temperature of the ambient environment is below a designated threshold temperature, then the control circuit 146 may select the second ground configuration. Alternately, if the ambient temperature is at or above the designated temperature, the control circuit 146 may select the first ground configuration shown in FIG. 4. The threshold temperature may be specific to different aircraft models, conditioned air requirements, component capabilities, and/or operator preferences. Non-limiting examples of temperatures that could be used as the threshold temperature include 60° F. (15.5° C.), 70° F. (21.1° C.), 80° F. (26.7° C.), and 90° F. (32.2° C.). For example, if the threshold temperature is designated as 80° F. (26.7° C.), then the control circuit 146 is configured to select the first ground configuration when the ambient temperature is at or above 80° F. (26.7° C.), and is configured to select the second ground configuration when the ambient temperature is below 80° F. (26.7° C.). Another condition or circumstance that may affect whether the first or second ground configuration is employed is a number of air conditioning packs 145 that are employed to provide cooling for the aircraft 10. For example, even if the ambient temperature is below the designated threshold temperature, the control circuit 146 may be configured to select the first ground configuration shown in FIG. 4 if two or more one air conditioning packs 145 are utilized.

FIG. 6 is a schematic diagram of the cooling system 115 showing the air conditioning pack 145 in a cruise flight configuration. The air conditioning pack 145 may be configured in the cruise flight configuration while the aircraft 10 is flying at a cruising altitude. The air conditioning pack 145 achieves the cruise flight configuration when the control circuit 146 sets the cabin air compressor valve 172B, the hot bypass valve 172C, and the condenser bypass valve 172D in the open position, and sets a first main valve 172E and a second main valve 172F in the closed position. The first main valve 172E is disposed between the hot bypass duct 188 and the first mixing duct 138A. By opening the hot bypass valve 172C and closing the first main valve 172E, all of the compressed ram air from the CAC assembly 126 may be directed through the hot bypass duct 188 to the second mixing duct 138B. Thus, the compressed ram air bypasses the ACM assembly 116 entirely, and only the air stream with the bleed air is compressed by the compressor 118 of the ACM assembly 116. Furthermore, because the compressed ram air bypasses the ACM assembly 116, the compressed air stream is composed only of the bleed air. In addition, only the bleed air represents the compressed air stream that is split into two streams and directed to the turbines 120, 130 for powering the ACM assembly 116 and the CAC assembly 126, respectively. The compressed ram air also bypasses the heat exchangers 112, 150. The compressed ram air does not mix with the bleed air of the compressed air stream to generate the hybrid air stream until the second portion of the compressed air stream exits the turbine 130 of the CAC assembly 126 and flows into the second mixing duct 138B.

By opening the cabin air compressor valve 172B, the second cabin air compressor 129 of the CAC assembly 126 receives ram air through the second ram air inlet duct 179. As a result, both of the cabin air compressors 128, 129 of the CAC assembly 126 are utilized to generate the compressed ram air. The expansion of the compressed bleed air in the turbine 130 powers both cabin air compressors 128, 129. The use of both cabin air compressors 128, 129 may increase the amount (e.g., mass flow rate, volumetric flow rate, or the like) of compressed ram air that is generated by the CAC assembly 126. The compressed ram air from the first and second cabin air compressors 128, 129 mixes in the duct 171 and is directed through the hot bypass duct 188.

The second main valve 172F is disposed between the condenser bypass duct 190 and the condenser 194. By opening the condenser bypass valve 172D and closing the second main valve 172F, an entirety of the compressed air stream from the compressor 118 is directed through the condenser bypass duct 190 to the splitter 134. The compressed air stream exiting the second heat exchanger 150 bypasses the condenser 194 and the water extractor 196. For example, moisture removal is not necessary at high altitude, so the control circuit 146 may bypass the compressed air stream around the condenser 194 and water extractor 196 to improve air cycle efficiency.

When the air conditioning pack 145 is in the cruise flight configuration, the air conditioning pack 145 receives bleed air in the bleed air inlet duct 174 from one or more of the main engines 14 (shown in FIG. 1). The air conditioning pack 145 does not receive bleed air from the auxiliary power unit 152 when in the cruise flight configuration. In an embodiment, the CAC assembly 126 may compress the ram air to be substantially the same as a cabin air pressure within the passenger cabin 28 and the flight deck 30 (both shown in FIG. 2). For example, cabin air compressors 128, 129 may compress the two different ram air streams such that the pressure of the compressed ram air may be within a designated range of the cabin air pressure (e.g., within 1%, 5%, or 10% of the cabin air pressure).

Optionally, the motor 208 that powers the fan 206 in the ram air heat sink circuit 144 may be turned off by the control circuit 146 while the aircraft 10 is in flight. The flow rate of the ram air through the ram air heat sink circuit 144 may be sufficient to provide the required heat absorption, so energy that would be used to power the motor 208 is conserved.

Although only one cruise flight configuration is shown herein, it is understood that the air conditioning pack 145 may be configurable in multiple different cruise flight configurations based on certain circumstances or conditions, such as ambient temperature, altitude, number of air conditioning packs 145 utilized, and/or the like.

Figure 7:
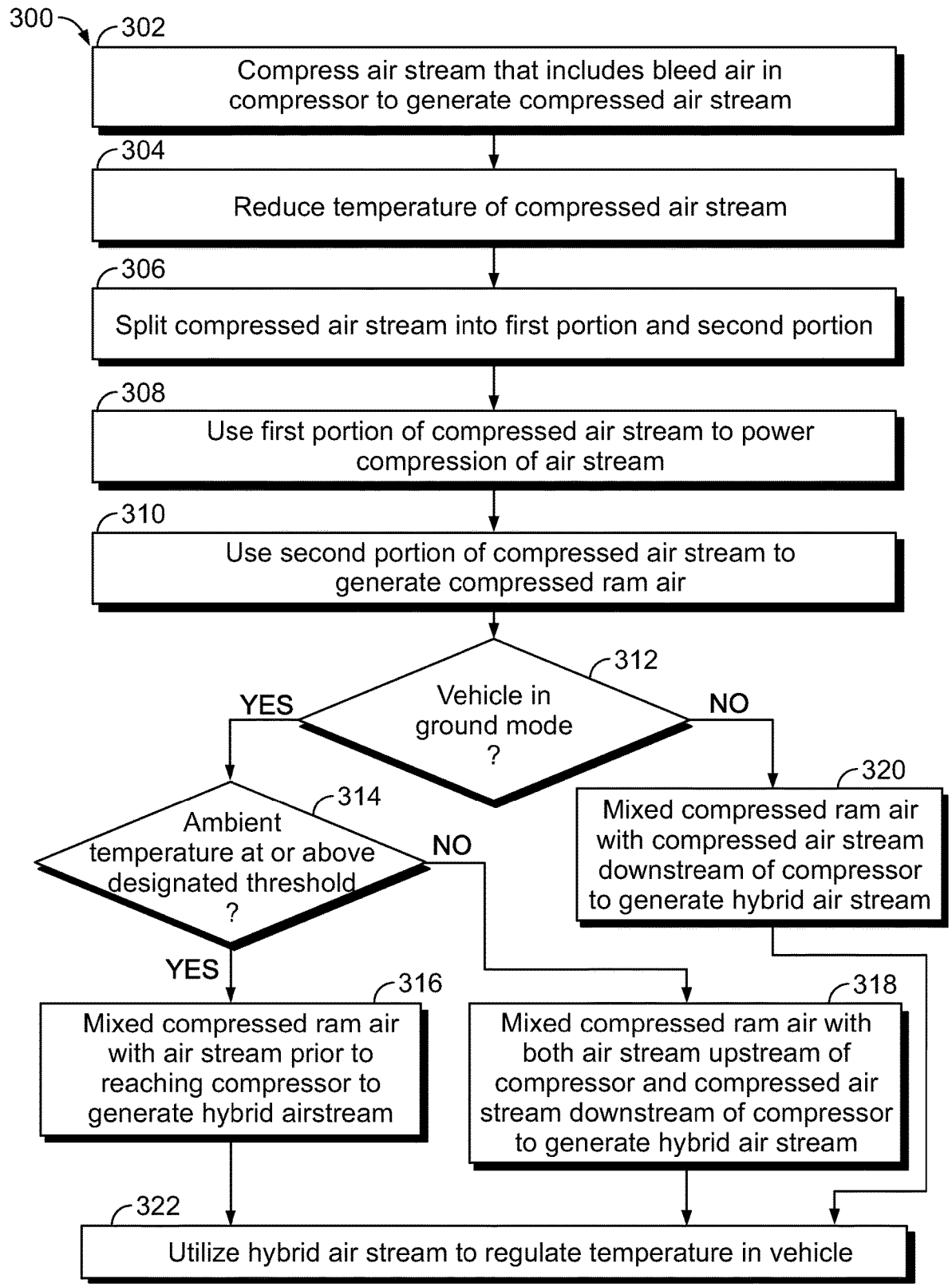
FIG. 7 is a flow chart of a method for conditioning air for use in a vehicle, according to an embodiment of the present disclosure.

FIG. 7 is a flow chart of a method 300 for conditioning air for use in a vehicle, according to an embodiment of the present disclosure. The method 300 may be performed according to the embodiments described herein with reference to FIGS. 1-6. For example, the method 300 may be used for conditioning air that is used for regulating temperature, ventilating, and/or pressurizing at least one compartment or space in the vehicle 10 shown in FIG. 1. The vehicle 10 is described as an aircraft herein (and is referred to as aircraft 10), but is not limited to an aircraft. The method 300 may be used on other types of transport vehicles, such as rail vehicles, buses, sea craft, and the like. The method 300 may be performed entirely or at least partially by the cooling system 115 shown in FIG. 2, including the air conditioning pack 145 and the control circuit 146.

At step 302, an air stream that includes bleed air is compressed in a compressor 118 to generate a compressed air stream. The compressor 118 may be a component of an air cycle machine (ACM) assembly 116. At step 304, an operating temperature of the compressed air stream is reduced. The compressed air stream may be directed to a heat exchanger 150 that allows heat from the compressed air stream to dissipate into an air stream within a ram air heat sink circuit 144.

At step 306, the compressed air stream is split into a first portion and a second portion. For example, the compressed air stream exiting the heat exchanger 150 may be directed to a splitter 134, which divides the compressed air stream into two separate streams. At step 308, the first portion of the compressed air stream is used to power compression of the air stream. For example, the first portion may be directed to a turbine 120 of the ACM assembly 116. The turbine 120 is mechanically coupled to the compressor 118 via a shaft 122. The first portion of the compressed air stream is expanded through the turbine 120 to drive rotation of the compressor 118 via the shaft 122. At step 310, the second portion of the compressed air stream is used to generate compressed ram air. For example, the second portion may be directed to a turbine 130 of a cabin air compressor (CAC) assembly 126. The turbine 130 is mechanically coupled to a first cabin air compressor 128 and a second cabin air compressor 129 via a shaft 132. The second portion of the compressed air stream is expanded through the turbine 130 to drive rotation of one or both of the cabin air compressors 128, 129. Ram air received at one or both of the cabin air compressors 128, 129 is pressurized to generate the compressed ram air.

At step 312, it is determined whether the vehicle (e.g., aircraft 10) is in a ground mode of operation. For example, a control circuit 146 may receive an input signal from a measurement device that indicates whether the aircraft 10 is on the ground or in flight. If the aircraft 10 is on the ground, then flow proceeds to step 314. At step 314, it is determine whether an ambient temperature outside of the aircraft 10 is at or above a designated threshold temperature. For example, the control circuit 146 may receive an input from a temperature sensor, and may compare the measured temperature to a recorded temperature threshold value to determine whether the ambient temperature is at or above the designated threshold. If the ambient temperature is at or above the designated temperature threshold, then flow of the method 300 proceeds to step 316.

At step 316, the compressed ram air is mixed with the air stream that includes bleed air prior to the air stream reaching the compressor 118, and the mixture defines or generates a hybrid air stream. For example, the control circuit 146 may set the air conditioning pack 145 in a first ground configuration at step 316 by controlling the position or states of various valves 172. In the first ground configuration, the compressed ram air is directed to a first mixing duct 138A upstream of the compressor 118, and mixes with the air stream in the first mixing duct 138A. The hybrid air stream, including both ram air and bleed air, is then compressed within the compressor 118 of the ACM assembly 116 to generate the compressed air stream at step 302.

If the ambient temperature at step 314 is below the designated temperature threshold, then flow proceeds to 318. At step 318, the compressed ram air is mixed with both the air stream upstream of the compressor 118 and the compressed air stream downstream of the compressor 118 to generate the hybrid air stream. For example, the control circuit 146 may set the air conditioning pack 145 in a second ground configuration at step 318 by modifying the positions of at least some of the valves 172 to change the flow path of air through the air conditioning pack 145. In the second ground configuration, a first portion of the compressed ram air is directed to the first mixing duct 138A to mix with the air stream upstream of the compressor 118, and a second, bypass portion of the compressed ram air is directed to a second mixing duct 138B to mix with the compressed air stream downstream of the compressor 118.

If the vehicle is not in the ground mode at 312, such that the aircraft 10 is in a cruise flight mode of operation, then flow of the method 300 proceeds to step 320. At step 320, the compressed ram air is mixed with the compressed air stream downstream of the compressor 118 to generate a hybrid air stream. For example, the control circuit 146 may configure the air conditioning pack 145 in a cruise flight configuration at step 320. In the cruise flight configuration, all of the compressed ram air may be directed through a hot bypass duct 188 to mix with the compressed air stream in the second mixing duct 138B. Thus, only the bleed air (not the compressed ram air) may be compressed within the compressor 118 to generate the compressed air stream at step 302, and only the bleed air may be split into the first and second portions at step 304 for use powering compression of the air stream at step 308 and generating the compressed ram air at step 310.

Step 322 follows each of the steps 316, 318, and 320. At step 322, the hybrid air stream, which includes both bleed air and compressed ram air, is mixed with the exhaust from the turbine 120 of the ACM assembly 116 and utilized to regulate temperature in the vehicle (e.g., aircraft 10). For example, the hybrid air stream mixed with turbine 120 exhaust flow may be discharged from the air conditioning pack 145 through an outlet port 140 and supplied to a passenger cabin 28, a flight deck 30, and/or other areas of the aircraft 10 to provide temperature control, ventilation, and/or pressurization.

Although not shown in FIG. 7, the method 300 may include one or more steps of reconfiguring the flow paths through the air conditioning pack 145 to switch configurations of the air conditioning pack 145. The reconfiguring steps may be performed by the control circuit 146 selectively opening and closing certain specific valves 172 to control and set different respective flow paths for the compressed ram air and the bleed air within the air conditioning pack 145. The reconfiguration may occur in response to the aircraft 10 transitioning between different modes of operation (e.g., from a ground mode of operation while on the ground to a cruise flight mode of operation during flight of the aircraft 10), a change in the ambient temperature, or the like.

As described herein, embodiments of the present disclosure provide conditioned air for a vehicle, such as an aircraft, that may utilize less bleed air extracted from an engine (e.g., a main engine and/or an auxiliary power unit) than known air conditioning systems. The embodiments described herein may also provide a more compact air conditioning pack than known air conditioning systems as the bleed air is mixed with the ram air within the air conditioning pack, optionally within a common housing. The embodiments described herein may exploit the energy potential of the bleed air by using the bleed air, with or without compressed ram air, to simultaneously drive the turbine of the ACM assembly and the turbine of the CAC assembly.

As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

As used herein, the term "controller", "central processing unit", "CPU", "computer", or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein". Moreover, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for conditioning air for use in a vehicle, the method comprising:

compressing, via a compressor of an air cycle machine assembly, an air stream that includes bleed air received from a bleed air source to generate a compressed air stream;

directing, via the air cycle machine assembly, a first portion of the compressed air stream from the compressor to a turbine of the air cycle machine assembly that is mechanically coupled to the compressor to power the compressing of the air stream that includes the bleed air;

expanding a second portion of the compressed air stream from the compressor of the air cycle machine assembly via a cabin air turbine of a cabin air compressor assembly, wherein the expanding of the second portion via the cabin air turbine powers rotation of a first cabin air compressor of the cabin air compressor assembly, the first cabin air compressor mechanically coupled to the cabin air turbine, compressing, via the first cabin air compressor, a ram air stream to generate compressed ram air;

in a ground mode of operation of the vehicle, controlling one or more valves, via a control circuit, to direct at least some of the compressed ram air to mix with the air stream that includes the bleed air in a first mixing duct to generate a first hybrid air stream, the first mixing duct disposed upstream of the compressor of the air cycle machine assembly; and utilizing the first hybrid air stream to regulate a temperature of at least one compartment in the vehicle.

2. The method of claim 1, further comprising splitting the compressed air stream from the compressor of the air cycle machine assembly into the first portion and the second portion via a splitter, and reducing an operating temperature of the compressed air stream prior to splitting the compressed air stream via a heat exchanger.

3. The method of claim 1, wherein the turbine of the air cycle machine assembly is mechanically coupled to the compressor of the air cycle machine assembly via a shaft.

4. The method of claim 1, wherein the cabin air compressor assembly comprises the cabin air turbine, the first cabin air compressor, and a second cabin air compressor that are mechanically coupled to each other and co-axially oriented relative to each other.

5. The method of claim 1, wherein, in response to an ambient temperature being at or above a designated threshold temperature, the method comprises controlling the one or more valves to direct all of the compressed ram air to mix with the air stream that includes the bleed air in the first mixing duct upstream of the compressor of the air cycle machine assembly.

6. The method of claim 1, wherein, in response to the vehicle being in a cruise flight mode of operation, the method further comprises controlling the one or more valves to direct the compressed ram air to mix with the compressed air stream in a second mixing duct that is disposed downstream of the compressor of the air cycle machine assembly.

7. A cooling system for a vehicle, the cooling system comprising:
 an air conditioning pack comprising:
  an air cycle machine assembly comprising a compressor configured to receive an air stream that includes bleed air from a bleed air source and to generate a compressed air stream, the air cycle machine assembly configured to direct a first portion of the compressed air stream from the compressor to a turbine of the air cycle machine assembly that is mechanically coupled to the compressor to power the compressor;
  a cabin air compressor assembly comprising a first cabin air compressor and a cabin air turbine that is mechanically coupled to the first cabin air compressor, the cabin air turbine configured to receive a second portion of the compressed air stream from the compressor of the air cycle machine assembly to power the first cabin air compressor, the first cabin air compressor configured to receive and compress a first ram air stream to generate compressed ram air; and
  one or more mixing ducts; and
 a control circuit operatively connected to the air conditioning pack, the control circuit configured to control flow paths through the air conditioning pack in different specific configurations based on one or more of a mode of operation of the vehicle or an ambient temperature outside of the vehicle, wherein, in a ground mode of operation of the vehicle, the control circuit is configured to direct at least a first portion of the compressed ram air to mix with the air stream that includes the bleed air in a first mixing duct of the one or more mixing ducts to generate a first hybrid air stream that is used for cooling at least a portion of the vehicle, the first mixing duct disposed upstream of the air cycle machine assembly.

8. The cooling system of claim 7, wherein the cabin air compressor assembly comprises a second cabin air compressor mechanically coupled to the cabin air turbine and powered by the cabin air turbine, wherein the second cabin air compressor is configured to receive and compress a second ram air stream and an output of the second cabin air compressor is mixed with an output of the first cabin air compressor to form the compressed ram air.

9. The cooling system of claim 7, further comprising a heat exchanger configured to reduce an operating temperature of the air stream that includes the bleed air, the compressor of the air cycle machine assembly configured to receive the air stream that includes the bleed air from the heat exchanger.

10. The cooling system of claim 7, further comprising a heat exchanger and a splitter, the splitter configured to divide the compressed air stream into the first portion and the second portion, the heat exchanger disposed between the compressor of the air cycle machine assembly and the splitter and configured to reduce an operating temperature of the compressed air stream from the compressor of the air cycle machine assembly prior to reaching the splitter.

11. The cooling system of claim 7, wherein the turbine of the air cycle machine is mechanically coupled to the compressor of the air cycle machine via a shaft.

12. The cooling system of claim 7, further comprising a splitter configured to divide the compressed air stream into the first portion and the second portion, wherein the splitter is disposed between the compressor of the air cycle machine assembly and the turbine of the air cycle machine assembly such that splitter receives the compressed air stream from the compressor of the air cycle machine assembly and directs the first portion of the compressed air stream to the turbine of the air cycle machine assembly.

13. The cooling system of claim 7, further comprising a housing, wherein the cabin air compressor assembly, the air cycle machine assembly, and the one or more mixing ducts are disposed within the housing.

14. The cooling system of claim 7, further comprising a condenser and a water extractor disposed in series downstream of the compressor of the air cycle machine assembly and upstream of the turbine of the air cycle machine assembly, wherein, in response to the vehicle being in the ground mode of operation, the control circuit is configured to direct the compressed air stream through the condenser and the water extractor to remove moisture from the compressed air stream.

15. The cooling system of claim 7, wherein, in response to the vehicle being in the ground mode of operation and the ambient temperature being at or above a designated threshold temperature, the control circuit is configured to direct all of the compressed ram air to mix with the air stream in the first mixing duct such that the first hybrid air stream is received at the air cycle machine assembly to generate the compressed air stream.

16. The cooling system of claim 7, wherein, in response to the vehicle being in the ground mode of operation and the ambient temperature being below a designated threshold temperature, the control circuit is configured to direct the first portion of the compressed ram air to the first mixing duct and to direct a second portion of the compressed ram air that is discrete from the first portion to mix with the compressed air stream in a second mixing duct of the one or more mixing ducts, the second mixing duct disposed downstream of the air cycle machine assembly.

17. The cooling system of claim 16, wherein the first portion of the compressed ram air has a greater mass flow rate than the second portion of the compressed ram air such that a majority of the compressed ram air is directed to the first mixing duct.

18. The cooling system of claim 7, wherein, in response to the vehicle being in a cruise flight mode of operation, the control circuit is configured to direct the compressed ram air to mix with the compressed air stream in a second mixing duct of the one or more mixing ducts to generate a second hybrid air stream that is used for cooling at least the portion of the vehicle, the second mixing duct disposed downstream of the air cycle machine assembly.

19. The cooling system of claim 7, wherein the cabin air compressor assembly comprises a second cabin air compressor mechanically coupled to the cabin air turbine, wherein, in response to the vehicle being in a cruise flight mode of operation, the control circuit is configured to direct the first ram air stream to the first cabin air compressor and a second ram air stream to the second cabin air compressor to generate the compressed ram air.

20. The cooling system of claim 19, wherein, in response to the vehicle being in the ground mode of operation, the control circuit is configured to direct the first ram air stream to the first cabin air compressor to generate the compressed ram air without directing the second ram air stream to the second cabin air compressor.

21. A cooling system for a vehicle, the cooling system comprising:
an air conditioning pack comprising:
an air cycle machine assembly comprising a compressor configured to receive an air stream that includes bleed air from a bleed air source and to generate a compressed air stream, the air cycle machine assembly configured to direct a first portion of the compressed air stream from the compressor to a turbine of the air cycle machine assembly that is mechanically coupled to the compressor to power the compressor;
a cabin air compressor assembly configured to receive a second portion of the compressed air stream from the compressor of the air cycle machine assembly, the cabin air compressor assembly configured to utilize the second portion to generate compressed ram air; and
one or more mixing ducts configured to receive the compressed ram air and allow the compressed ram air to mix with one or more of the air stream upstream of the compressor or the compressed air stream downstream of the compressor to generate a hybrid air stream that is used for cooling at least a portion of the vehicle; and
a control circuit operatively connected to the air conditioning pack, the control circuit configured to control flow paths through the air conditioning pack in different specific configurations based on one or more of a mode of operation of the vehicle or an ambient temperature outside of the vehicle, wherein, in response to the vehicle being in a ground mode of operation and the ambient temperature being at or above a designated threshold temperature, the control circuit is configured to direct all of the compressed ram air to mix with the air stream in a first mixing duct of the one or more mixing ducts, the first mixing duct disposed upstream of the air cycle machine assembly such that the hybrid air stream is received at the air cycle machine assembly to generate the compressed air stream, and
wherein, in response to the vehicle being in the ground mode of operation and the ambient temperature being below the designated threshold temperature, the control circuit is configured to direct a first portion of the compressed ram air to mix with the air stream in the first mixing duct and to direct a second portion of the compressed ram air to mix with the compressed air stream in a second mixing duct of the one or more mixing ducts, the second mixing duct disposed downstream of the air cycle machine assembly.

* * * * *